United States Patent [19]
Hong

[11] Patent Number: 5,189,561
[45] Date of Patent: Feb. 23, 1993

[54] AUTOMATIC OSCILLATING VEHICLE MIRROR

[76] Inventor: Sun T. Hong, 412 Mountain View Court, Orange, Calif. 92669

[21] Appl. No.: 858,488

[22] Filed: Mar. 27, 1992

[30] Foreign Application Priority Data

Mar. 28, 1991 [KR] Rep. of Korea ............ 91-4139

[51] Int. Cl.⁵ .................... G02B 7/18; B60R 1/08
[52] U.S. Cl. .................... 359/843; 359/872; 359/877
[58] Field of Search ........... 359/841, 843, 844, 871, 359/872, 877

[56] References Cited

U.S. PATENT DOCUMENTS

| | | | |
|---|---|---|---|
| 2,330,444 | 9/1943 | Park | 359/865 |
| 4,105,301 | 8/1978 | Doeg | 359/877 |
| 4,318,590 | 3/1982 | Hanley | 359/843 |
| 4,906,089 | 3/1990 | Biondi et al. | 359/843 |
| 5,052,792 | 10/1991 | McDonough | 359/843 |

Primary Examiner—Bruce Y. Arnold
Assistant Examiner—R. D. Shafer
Attorney, Agent, or Firm—Birch, Stewart, Kolasch & Birch

[57] ABSTRACT

An automatic oscillating vehicle side mirror includes a basic plate body having a pair of outer hollow brackets and a solenoid with an operating lever, and a mirror fixing plate having a convex vehicle side mirror and a pair of inner brackets whereby upon operating the turning signal and upon turning the vehicle, the operating lever moves into the solenoid so that the convex side mirrors automatically oscillate at both end portions of the side mirrors for providing a wide angle view toward the left and right sides of the vehicle and which reduces or eliminates the blind spot.

3 Claims, 2 Drawing Sheets

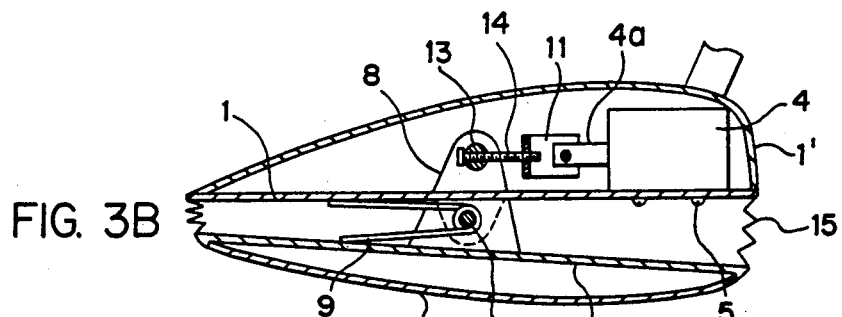
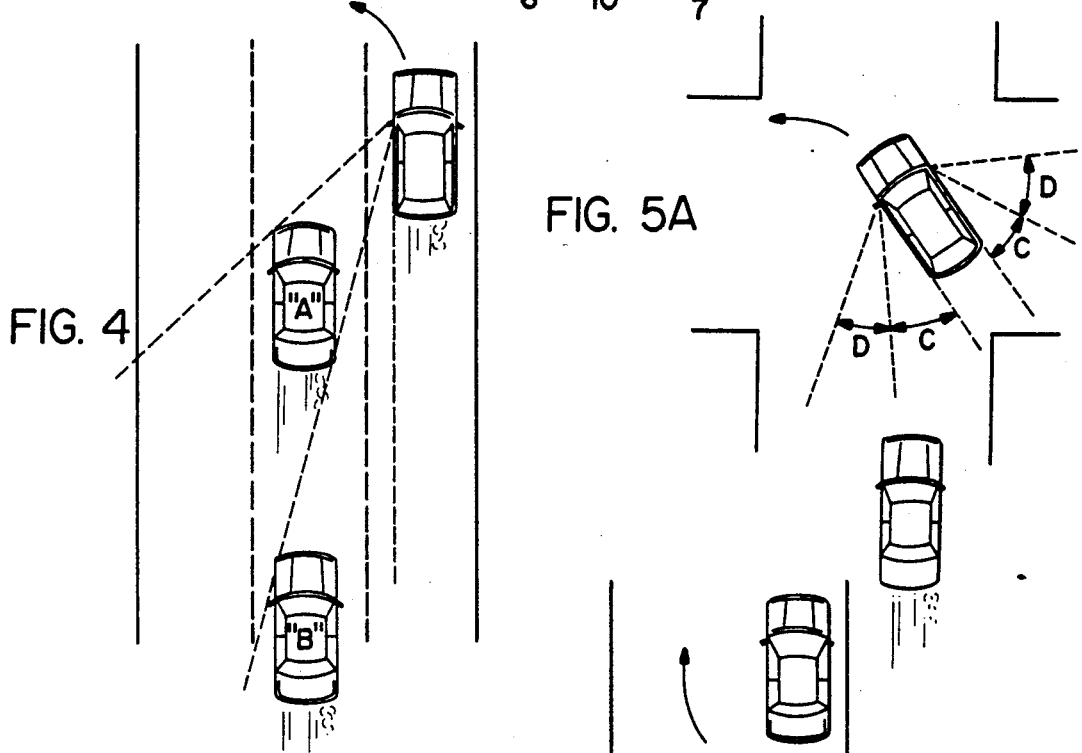
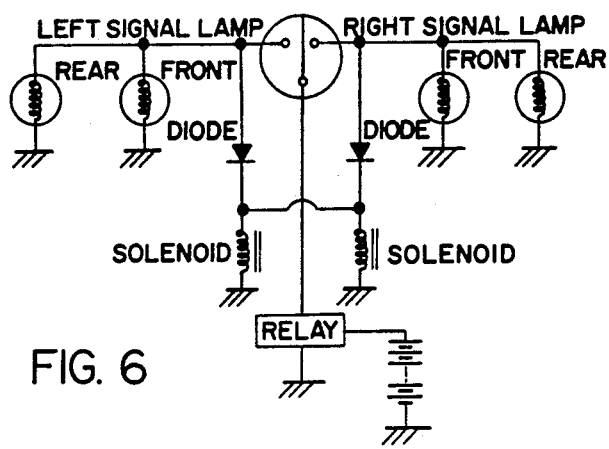

AUTOMATIC OSCILLATING VEHICLE MIRROR

BACKGROUND OF THE INVENTION

1. Field of the Invention

The present invention relates to an automatic oscillating vehicle mirror and more particularly, to an automatic oscillating vehicle side mirror for use as side view mirrors whereby upon operating the turning signal and upon turning the vehicle, the side mirrors automatically oscillate at both end portions thereof for providing a wide angle view toward the left and right sides of the vehicle and which substantially reduces or eliminates the blind spot which cannot be imaged by conventional side mirrors.

2. Description of the Prior Art

Various types of vehicle side mirrors are well known in the art. Such conventional vehicle side mirrors which include generally convex reflective areas have been developed for providing a view which is more extensive than that which can be provided by a flat reflective surface. Also, several types of such conventional vehicle side mirrors which have a small convex reflective mirror attached to a basic flat reflective mirror are known in the art. However, these vehicle side mirrors do not provide a full view of the left and right side portions of the vehicle and furthermore these conventional devices do not substantially eliminate the blind spots normally associated with side view mirrors and accordingly it is difficult for the driver of the vehicle to clearly observe vehicles approaching from the left or the right side of the vehicle.

SUMMARY OF THE INVENTION

Accordingly, it is an object of the present invention to provide an improved automatic oscillating vehicle side mirror which eliminates the above problems encountered in conventional vehicle side mirrors.

Another object of the present invention is to provide automatic oscillating vehicle side mirrors for a vehicle whereby upon operating the turning signal and upon turning the vehicle, the side mirrors automatically oscillate at both end portions thereof for providing a wide angle view toward the left and right sides of the vehicle and which substantially reduces or eliminates the blind spot which cannot be imaged by conventional vehicle side mirrors.

A further object of the present invention is to provide a side view mirror of the vehicle, which is simple in structure, compact for portability, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic oscillating vehicle side mirror which includes a basic plate body having a pair of outer hollow brackets and a solenoid with an operating lever, and a mirror fixing plate having a convex vehicle side mirror and a pair of inner brackets whereby upon operating the turning signal and upon turning the vehicle, the operating lever moves into the solenoid so that the convex side mirrors automatically oscillate at both end portions of the side mirrors for providing a wide angle view toward the left and right sides of the vehicle so as to reduce or eliminate the blind spot.

BRIEF DESCRIPTION OF THE DRAWINGS

The present invention will fully understood from the detailed description given hereinbelow and the accompanying drawings which are given by way of illustration only, and thus are not limitative of the present invention, and wherein:

FIG. 3B is a sectional view of FIG. 2, taken along line A—A, in an oscillated portion;

FIG. 4 is a top plane view of the vehicle having the automatically oscillating vehicle side mirrors, in a changing lane state of the vehicle;

FIG. 5A is a top plane view of the vehicle having the automatically oscillating vehicle mirrors, in a turning state of the vehicle in an intersection;

FIG. 5B is a top plane view of the vehicle having the automatically oscillating vehicle side mirrors, in a turning state of the vehicle from the parallel parking; and FIG. 6 shows a circuit of connection of a solenoid, a relay, a turning signal lamp, a turning signal switch, and an electric source according to the present invention.

DESCRIPTION OF THE PREFERRED EMBODIMENTS

Figure 1:
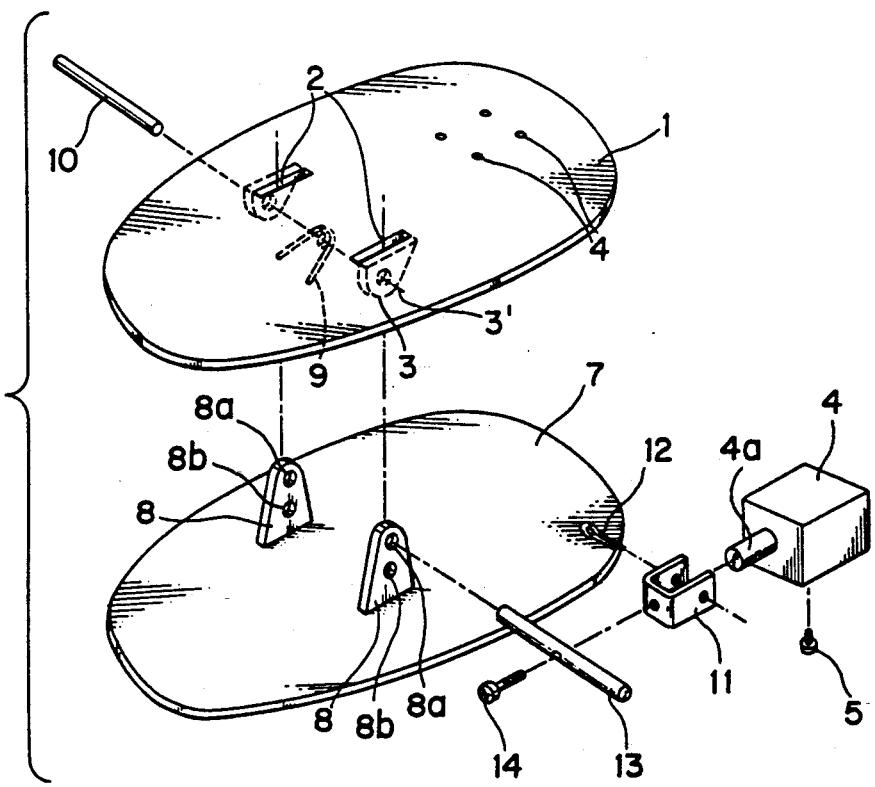
FIG. 1 is an exploded perspective view of the automatically oscillating vehicle side mirror according to the present invention.
Figure 2:
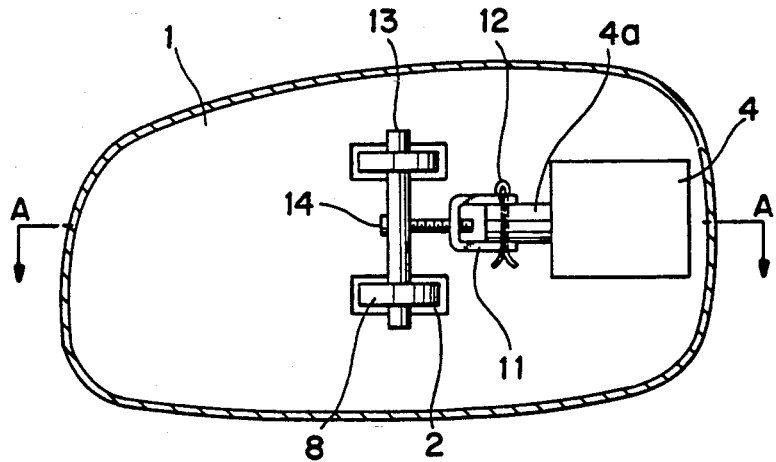
FIG. 2 is a top plane view of the automatically oscillating side mirror containing a cut away the cover thereof according to the present invention.

Referring now in detail to the drawings for the purpose of illustrating preferred embodiments of the present invention, the automatic oscillating vehicle side mirror as shown in FIGS. 1, 2, and 3 includes a main plate body 1 including a pair of outer hollow brackets 3 with an aperture 3', and an L-shaped spring 9 located between outer hollow brackets 3 wherein the outer hollow brackets 3 and the spring 9 are disposed on one side of the front surface of the main plate body 1. The main body 1 further includes a pair of rectangular apertures 2 adjacent the pair of outer hollow brackets 3, and a plurality of apertures 4' disposed on the other side of the front surface of the main plate body 1.

Figure 3A:
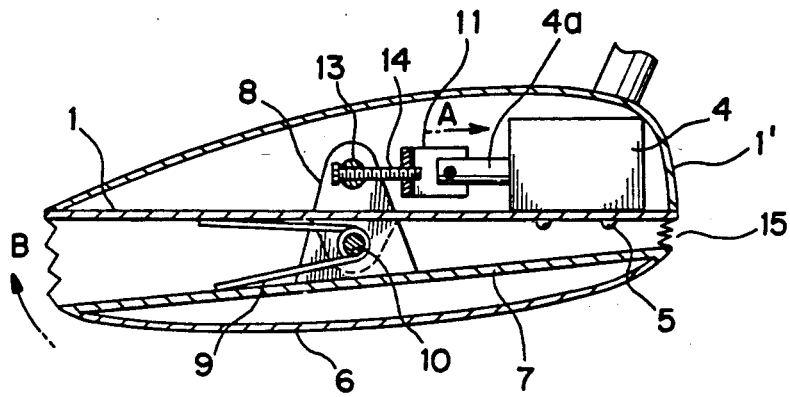
FIG. 3A is a sectional view of FIG. 2, taken along line A—A in an original portion.

A solenoid 4 having an operating lever 4a is mounted on the other side of the rear surface of the main plate body 1 by a plurality of screws 5 through the plurality of apertures 4'. The main plate body 1 is provided with a cover 1' for covering the solenoid 4 mounted on the rear surface thereof as shown in FIGS. 3A and 3B.

The automatically oscillating vehicle side mirror further includes a mirror fixing plate 7 including a pair of inner brackets 8 supported thereon. Each of the inner brackets 8 has upper and lower apertures 8a and 8b disposed therein, which are disposed on one side of the rear surface thereof to be inserted into each outer hollow bracket 3. The mirror fixing plate 7 is provided with a side mirror 6 fixed to the mirror fixing plate 7 as shown in FIGS. 3A and 3B. While assembling, the pair of inner bracket 8 are inserted into the pair of rectangular apertures 2 together with the outer hollow brackets 3 of the mirror fixing plate 7. At this time, a first shaft rod 10 is inserted into aperture 3' of the pair of outer hollow brackets 3, the lower apertures 8b of the pair of inner brackets 3, and the L-shaped spring 9. Therefore, the mirror fixing plate 7 can rotate in a certain angle, centered at the first shaft rod 10.

The operating lever 4a of the solenoid 4 is pivotally connected to a C-shaped connector 11 by a cotter pin 12. A second shaft rod 13 is inserted into the pair of upper apertures 8a of the pair of inner brackets 8. The C-shaped connector 11 is movably connected to the second shaft rod 13 by an adjustable bolt 14 as shown in FIGS. 3A and 3B. A belows 15 is installed between a circumference of the main plate body 1 and that of the mirror fixing plate 7. By adjusting the adjustable bolt 14, the oscillating angle of side mirror 6 can be determined.

The automatic oscillating vehicle side mirror according to the present invention operates as follows.

As shown in FIG. 6, when the driver turns the turning lever of a turning signal in the left turn position, the solenoid 4 is charged with electricity so that the solenoid 4 actuates thereby allowing the operating lever 4a to be pulled in the direction indicated by arrow A (FIG. 3A). Therefore, the side mirror 6 rearwardly moves at the most far end side from the driver indicated by arrow B (FIG. 3A) and the left side mirror 6 outwardly faces to the left outside direction of the vehicle. Also the right side mirror 6 outwardly faces to the right outside direction of the vehicle. Accordingly, the mirrors 6 provide a wide angle view toward the left and right sides and the driver can see the vehicle "A" in the blind spot of the left lane as well as the vehicle "B" in the left lane (FIG. 4). Whenever the turning lever is operated, both solenoids 4 disposed in both side view mirrors are charged with electricity and similarly operate. At this time, according to the circuit as shown in FIG. 6, the turning signal is in an off state, and the solenoid 4 is not charged with electricity so that side mirrors 6 return to their original positions due to the biasing force of the springs ends respectively. Thus, while the turning signal is actuated, the side mirrors 6 automatically oscillate by the relay (FIG. 6). Thus by oscillating the side mirrors 6, the driver can see a wide angle of the rear outside area behind the vehicle and the blind spot can be reduced or eliminated.

As shown in FIGS. 5A and 5B, when the vehicle turns in an intersection or turns during parallel parking, and when the turning lever of the turning signal is actuated in the left position, the side mirrors 6 provide a wide angle view which includes the illustrated C area plus the D area. After the vehicle turns and the turning signal is turned off, the solenoid 4 is no longer charged with electricity so that the mirrors 6 finally return to their original positions by the biasing force of the L-shaped spring 9.

Accordingly, the automatic oscillating vehicle side mirror of the present invention can reduce or eliminate the blind spot which cannot be imaged by conventional side mirrors when the vehicle turns and the turning signal is actuated since the side mirrors of the present invention have a wide angle view toward the left and right rear directions. Also, when the turning signal is turned off, the mirrors return to the original positions. In addition, the mirrors of the present invention are very simple in structure, inexpensive to manufacture, and easy in operation.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic oscillating vehicle side mirror for vehicles having a turning signal and side view mirrors, comprising:
    a basic plate body, said basic plate body including:
        a pair of a rectangular openings disposed on one side thereof,
        a pair of outer hollow brackets adjacent said pair of rectangular openings and are disposed on the front surface thereof, each of said outer hollow brackets having an aperture,
        an L-shaped coil spring disposed between said pair of outer hollow brackets, and
        a plurality of bolt apertures disposed on the other side thereof,
    a mirror fixing plate including a pair of inner brackets, each of said inner brackets having an upper aperture and a lower aperture,
    a side mirror secured to said mirror fixing plate,
    a solenoid member fixed to the rear surface thereof and aligned with said plurality of bolt apertures by a plurality of bolts, said solenoid member including:
        a solenoid body,
        an operating lever movably connected to said solenoid body so as to be backwardly moved into and frontwardly moved from the solenoid body when the solenoid body is charged with electricity from an electric source of the vehicle by a relay, and
        a C-shaped connector connected to said operating lever by a cotter pin,
    a first shaft rod rotatably inserted into said apertures of said pair of outer hollow brackets, said lower apertures of said pair of inner brackets and said L-shaped coil spring, and
    a second shaft rod rotatably inserted into said upper apertures of said pair of inner brackets and said second shaft rod adjustably connected to said C-connector by a screw for providing a certain angle of the mirror fixing plate, whereby upon operating the turning signal of the vehicle, the operating lever pulls and pushes the second shaft rod so that the side view mirrors are rearwardly moved by said relay for providing a wide angle view toward the left and right directions and which substantially reduces or eliminates a particular blind spot.

2. The automatic oscillating vehicle side mirror for vehicles of claim 1, wherein said basic plate body is provided with a Bellows for attaching circumferentially to the basic plate body and the mirror fixing plate.

3. The automatic oscillating vehicle side mirror for vehicles of claim 1, wherein upon turning off the turning signal, said solenoid body is no longer charged with electricity from the relay, so that the side mirrors return to their original positions due to the biasing force of said spring.

* * * * *